United States Patent [19]

Kindseth et al.

[11] 4,236,205

[45] Nov. 25, 1980

[54] ACCESS-TIME REDUCTION CONTROL CIRCUIT AND PROCESS FOR DIGITAL STORAGE DEVICES

[75] Inventors: Douglas M. Kindseth, Stewartville; Glen R. Mitchell, Pine Island, both of Minn.

[73] Assignee: International Business Machines Corporation, Armonk, N.Y.

[21] Appl. No.: 953,667

[22] Filed: Oct. 23, 1978

[51] Int. Cl.² .............................................. G06F 9/22
[52] U.S. Cl. ................................................... 364/200
[58] Field of Search ................................ 364/200, 900

[56] References Cited

U.S. PATENT DOCUMENTS

| | | | |
|---|---|---|---|
| 3,728,686 | 4/1973 | Weisbecker | 364/200 |
| 3,761,885 | 9/1973 | Van Heel | 364/200 |
| 3,898,624 | 8/1975 | Tobias | 364/200 |
| 3,900,835 | 8/1975 | Bell | 364/200 |
| 3,940,741 | 2/1976 | Horikoshi | 364/200 |
| 4,025,771 | 5/1977 | Lynch | 364/200 |
| 4,050,094 | 9/1977 | Bourke | 364/200 |

OTHER PUBLICATIONS

Bergey "IBM Technical Disclosure Bulletin" vol. 20, No. 10 Mar. 1978.
Kratz "IEEE Trans. on Computers" vol. C-23 No. 8 Aug. 1974, pp. 808-817.
Agrawala "Foundations of Microprogramming" 1976 pp. 76-79.
Aichelmann "IBM Technical Disclosure Bulletin" vol. 18, No. 11 Apr. 1976 pp. 3707-3708.
Gindele "IBM Technical Disclosure Bulletin" vol. 20, No. 2, Jul. 1977.

*Primary Examiner*—Charles D. Miller
*Attorney, Agent, or Firm*—Pennie & Edmonds

[57] ABSTRACT

A circuit and process for controlling access to a digital storage device is disclosed. The process involves reading a control word from a control store and partially decoding an address field of the control word to predict the storage location to be accessed. The address field is subsequently fully decoded to determine the actual storage location to be accessed. Prior to completion of this decoding step, an access to the predicted location in main storage is initiated. In the event the actual storage location to be accessed differs from the predicted one, the memory access previously initiated is overridden and an access to the actual storage location is initiated. A digital computer system incorporating a circuit for carrying out this process exhibited significantly reduced running times for typical computer programs.

10 Claims, 7 Drawing Figures

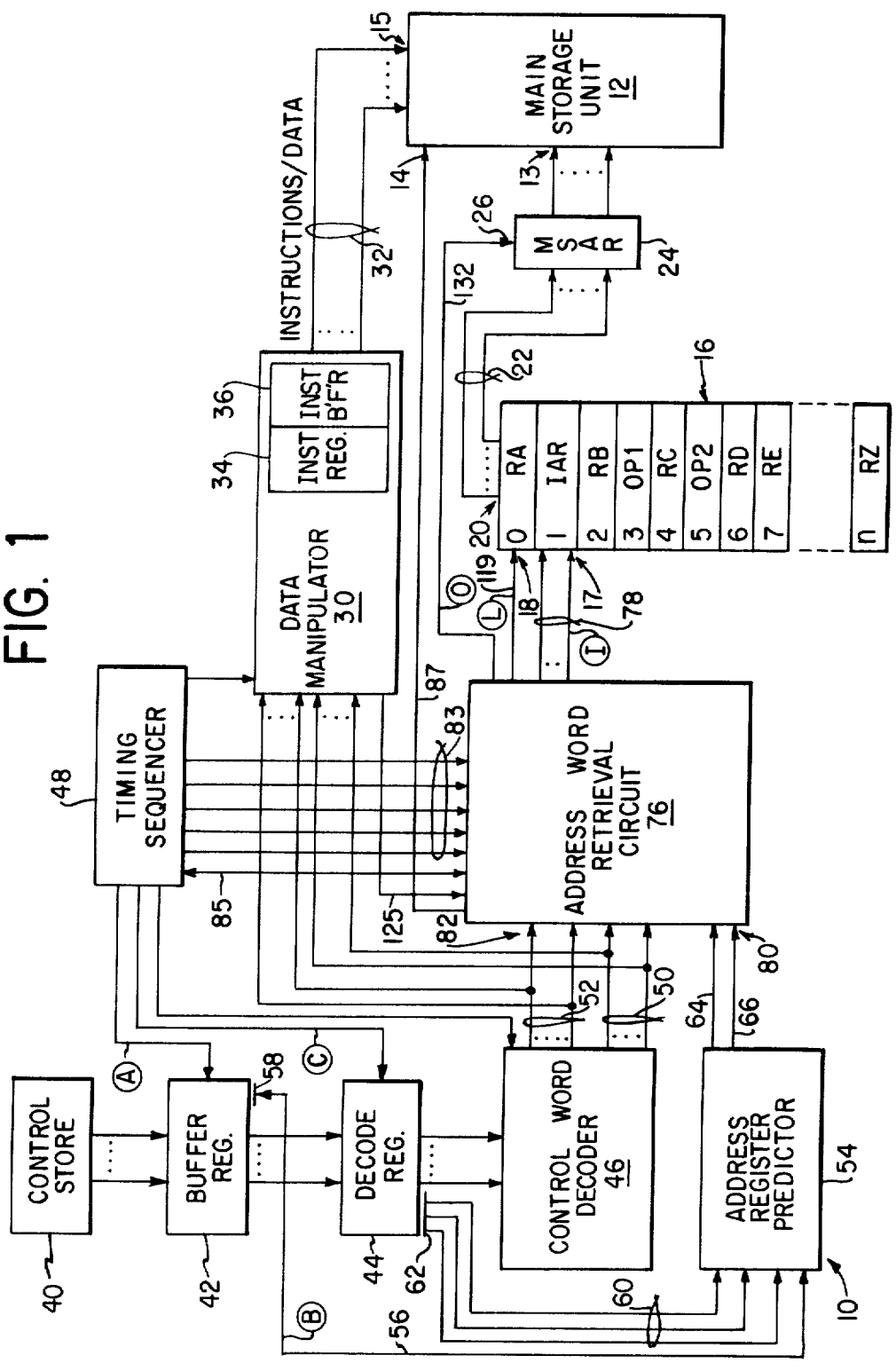

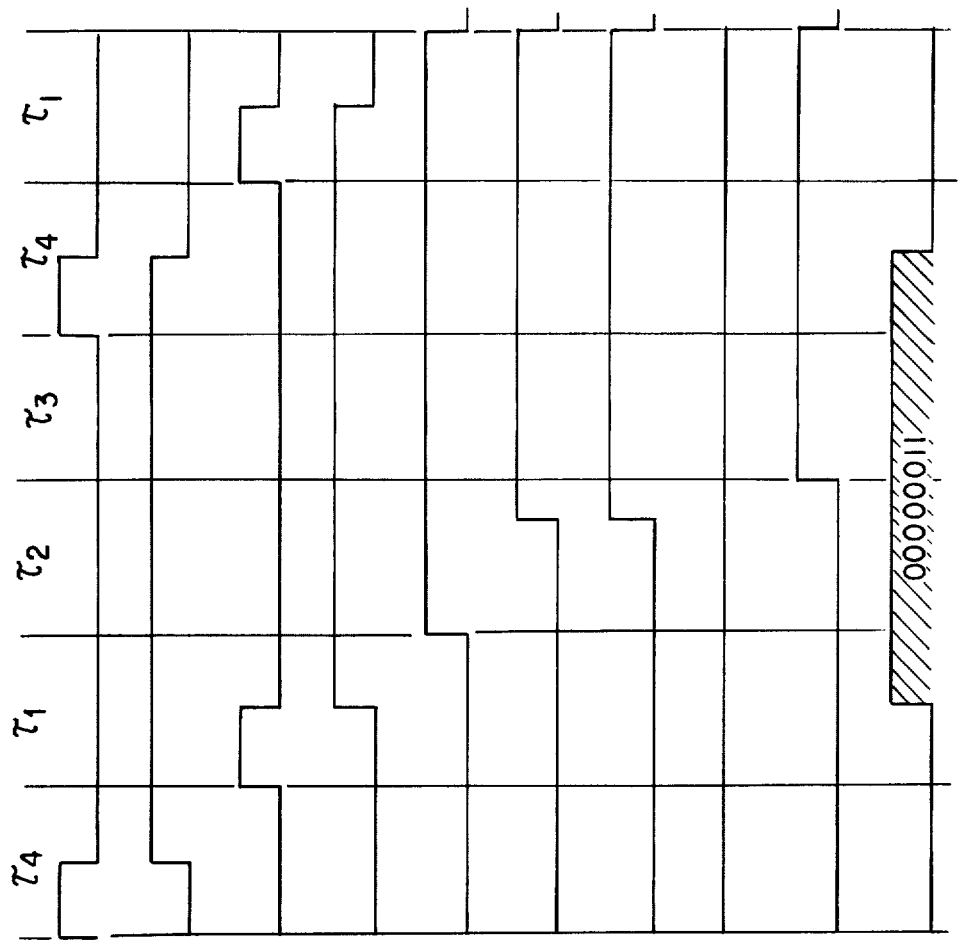

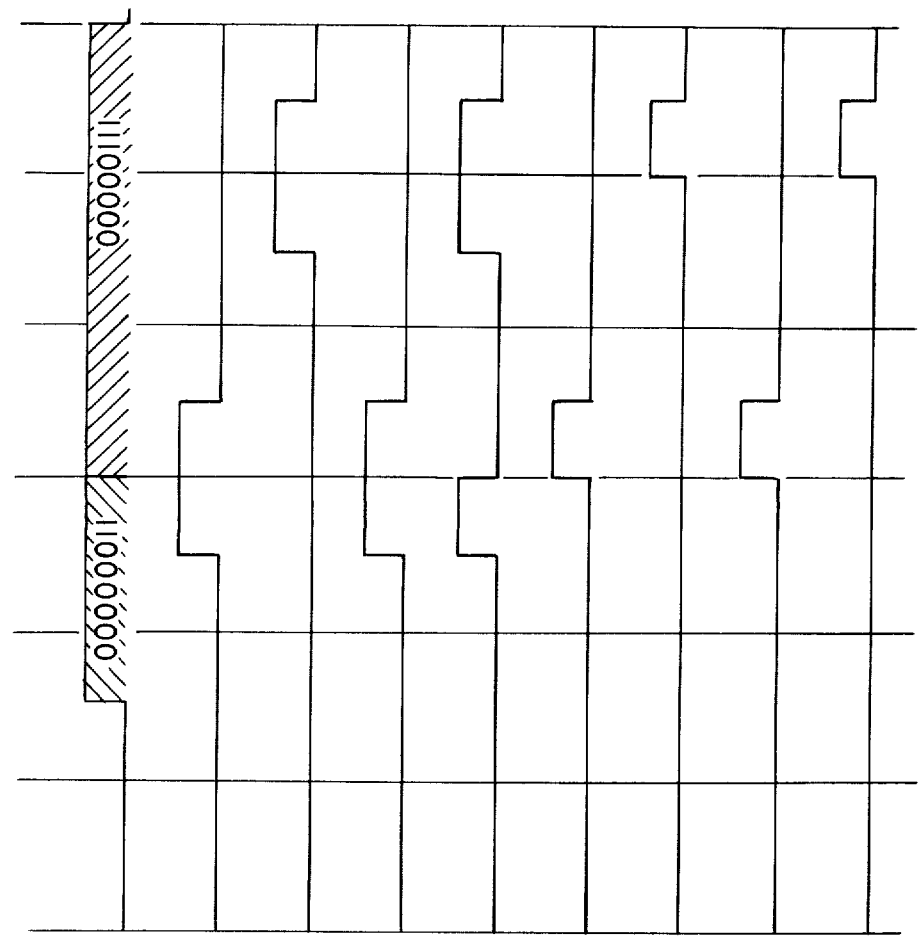

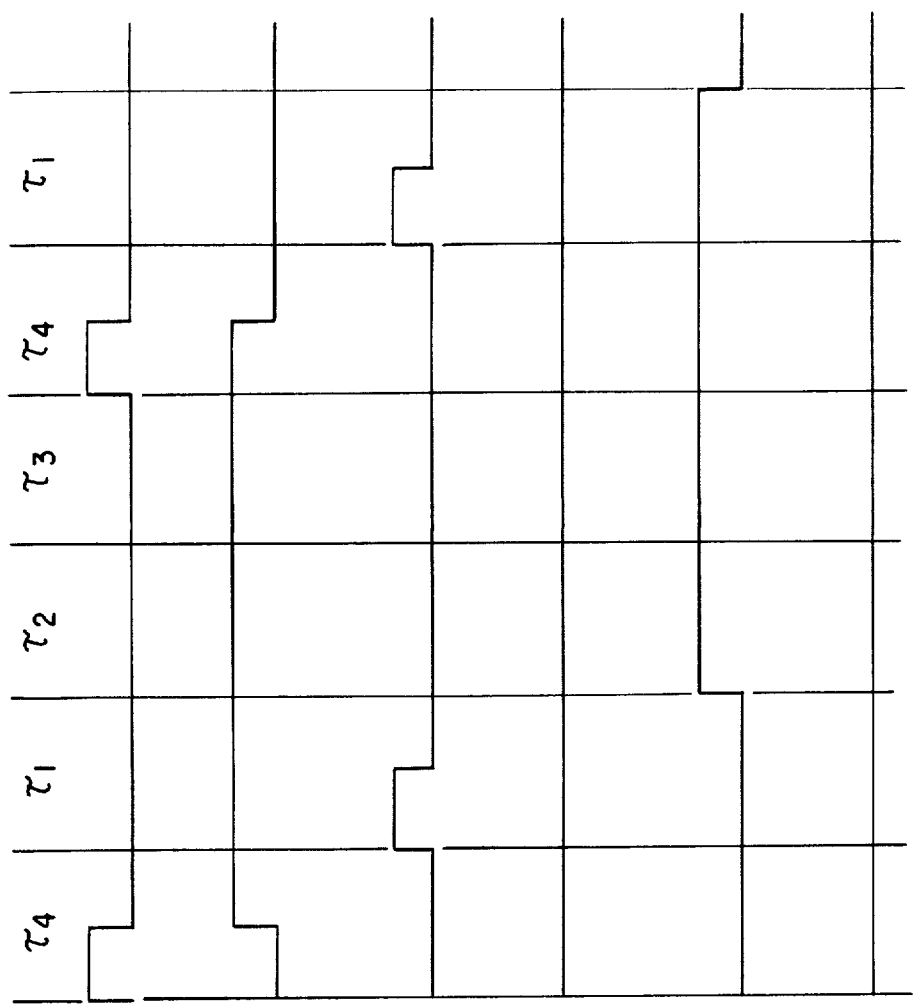

ACCESS-TIME REDUCTION CONTROL CIRCUIT AND PROCESS FOR DIGITAL STORAGE DEVICES

TECHNICAL FIELD

The present invention relates to a process and circuit for controlling access to a digital storage device. The term "accessing" embraces reading digital information from and writing digital information into locations within a storage unit. Digital computers, among other devices, employ control circuitry for directing digital information to and from selected storage locations. The access control circuit of the present invention is of the type generally termed a microprogrammed control circuit, since the control signals generated by the circuit are derived in part from control words read from a control store.

BACKGROUND ART

Digital computers are widely available which have microprogram controlled central processors. In such computers, the execution of a single "machine-language" instruction from an instruction stream in main storage can entail the execution of a sequence of more elementary instructions, generally termed microinstructions or control words. For example, a machine-language instruction to add two numbers located in main storage and store the sum in the memory location of one of them might involve a sequence of nine microinstructions: (1) load the address of the first addend in a main-store address register; (2) read the contents of the main store location specified in the main-store address register; (3) transfer the first addend from a main-store read output register to a first register in the central processor; (4) load the address of the second addend in the main-store address register; (5) read the contents of the main store location specified in the main-store address register; (6) transfer the second addend from the main-store read output register to a second register in the central processor; (7) add the contents of the first and second registers and store the sum in the first register; (8) transfer the contents of the first register to a main-store write input register; and (9) write the contents of the write input register into the memory location specified by the address register. Microinstructions are generally stored in a memory termed the control store. The control store is typically, but not necessarily, separate from the main storage units of the computer.

In a typical digital computer having a microprogram-controlled central processor, microinstruction routines define the machine-language instructions executed by the processor, as well as specify certain control functions for the computer such as directing input/output data transfers. To provide for machine-language instructions which call for accessing main storage, the microinstruction repertoires of such computers include microinstructions for controlling access to main storage. Descriptions of digital computers having conventional microprogram-controlled central processing units may be found in the following two books and in the references cited therein: *Foundations of Microprogramming* by Ashok K. Agrawala and Tomlinson G. Rauscher (Academic Press, Inc. 1976) and *Microprogramming Principles and Practices* by Samir S. Husson (Prentice-Hall, Inc. 1970).

A significant drawback of microprogram-controlled central processing units is the longer time ordinarily required to execute machine-language instructions as compared to execution times in processors which implement machine-language instructions with hardwired logic circuits. Since operation of a microprogram-controlled central processing unit involves execution of sequences of microinstructions, the speed of the processor is determined, in part, by the time required to execute the various microinstructions. Circuits for microprogrammed central processors have been devised which attempt to minimize the execution time of microinstructions, including those which involve accessing main storage, but none of these circuits provides a completely satisfactory balance between complexity, and thus cost, and speed of execution.

A known technique for reducing the time to carry out a sequence of microinstructions involves overlapping the execution of the current microinstruction with the fetching of the next microinstruction from the control store. This overlapping technique has been termed parallel implementation. As pointed out on pages 77-79 of the book by Agrawala and Rauscher, a problem can arise with parallel implementation when microinstructions containing conditional branch microoperations are to be executed. In this case the address of the next microinstruction in control store may not be determined until the end of the execution phase of the current microinstruction, which precludes overlapping the fetching of the next microinstruction with the execution of the current one. In such cases a combined serial-parallel implementation is necessary, in which fetching of the next microinstruction is carried out in parallel with the execution of the current microinstruction unless the current microinstruction involves a conditional branch. It is noted in the cited passage that the performance of combined serial-parallel implementation can be improved by guessing that the tested condition will be true and fetching in parallel the microinstruction at the guessed address. A serial fetch is thus required only when the guess is not correct. However, since such a guess would be essentially arbitrary in general, it is to be expected that the guess would turn out to be incorrect a significant fraction of the time.

DISCLOSURE OF THE INVENTION

We have invented an access control circuit for controlling access to a digital storage device which significantly reduces, on the average, the time required to effect accesses to storage, while avoiding problems of the prior art noted above. Broadly, the process implemented by the control circuit involves predicting the address of the location to be accessed in the storage device, the prediction being based on partially decoding a control word prior to decoding the word sufficiently completely to determine which, if any, location is to be accessed.

More particularly, the access control circuit of the present invention includes a plurality of address registers, which, for reasons of economy, are preferably implemented in semiconductor random-access, read-/write memory arrays. The address registers are designated by digital identifiers. Each address register is capable of storing a digital address word which encodes a primary-storage address identifying a location within a storage device such as the main store of a digital computer.

The control circuit further includes a control store having a plurality of control-store locations capable of storing control words which encode primary storage access commands. The primary-storage access commands determine storage locations to be accessed by specifying address registers which encode the addresses of the locations.

The control circuit further includes a control-word decode register for storing control words during decoding. Interposed between the control-word decode register and the control store is a control-word buffer register, which stores control words read from control store prior to their transfer to the decode register. At least one bit-position output of the control-word buffer register defines an identifier-prediction-field output terminal of the buffer register. An identifier-specification-field output terminal is defined by a plurality of bit-position outputs of the control-word decode register. The control circuit also includes a control-circuit timing sequencer for loading control words from the control store into the control-word buffer register for storage during a first time interval and subsequently loading the control words from the buffer register into the decode register for storage during a second time interval.

An address-register-prediction circuit is included in the control circuit of the present invention for predicting an address register specified by the control word stored in the buffer register. The address-register-prediction circuit has an input terminal connected to the identifier-prediction-field output terminal of the control-word buffer register and a predicted-identifier output terminal. It also has a partial-decoder circuit for generating address-register prediction signals at the predicted-identifier output terminal responsive to control-word-bit signals applied to the input terminal during the first time interval. Additional information, including information obtained subsequent to the beginning of the second time interval, may be used in generating address-register prediction signals, if desired.

The control circuit further includes a control-word decoder circuit which is connected to the control-word decode register for fully decoding the specification of the address register by the control word stored in the decode register. The control-word decoder circuit has an input terminal connected to the identifier-specification field output terminal of the control-word decode register and a specified-identifier output terminal. It also has a decoder circuit for generating address-register specification signals at the output terminal responsive to control-word-bit signals applied to the input terminal during the second time interval.

The control circuit also includes an address-word retrieval circuit for obtaining the information stored in a specified address register. The address-word retrieval circuit is connected to the address registers and has a first and a second identifier input terminal and an address-word output terminal. The first identifier input terminal is connected to the predicted-identifier output terminal of the address-register-prediction circuit. The second identifier input terminal is connected to the specified-identifier output terminal of the control-word decoder circuit.

In addition, the address-word retrieval circuit has a predicted-register retrieval-initiator circuit which is connected to the control-circuit timing sequencer and to the first identifier input terminal. At a time before the control-word-decoder circuit has decoded the specification of the address register by the control word in the decode register, the predicted-register retrieval circuit initiates retrieval of contents of the address register specified by the address-register prediction signal received at the first identifier input.

The address-word retrieval circuit also includes an identifier-override circuit. In the event the address register specified at the second identifier input differs from the address register specified at the first identifier input, the identifier-override circuit initiates retrieval of contents of the address register specified by address-register specification signals at the second identifier input. The initiation of the retrieval occurs at a time after the control-word decoder circuit has decoded the specification of the address register by the control word in the decode register. Thus, only when the predicted address register is not the correct one is time lost in fully decoding the identifier-specification field of the control word before initiating the retrieval of the contents of the correct address register.

In preferred embodiments of the present invention the coding of the control word is arranged so that only a few bits of the word are needed to distinguish among the address registers most often referenced. For example, identifiers of the two most frequently referenced address registers might be encoded in the control words so that the corresponding control words differed in only a single bit position. In such a case the partial decoder circuit of the identifier-prediction circuit need have only a few logic gates. Nonetheless, to the extent the two address registers in question are the most frequently referenced, such a simple identifier-prediction circuit could predict the correct address register a high percentage of the time.

Incorporating a memory access control system of the invention in a computer system was estimated to have reduced the running time of typical programs by roughly four percent; a remarkable improvement, particularly in view of the simplicity of the circuit.

BRIEF DESCRIPTION OF THE DRAWINGS

Preferred embodiments of the invention are described below with reference to the following drawings:

FIG. 1 is a schematic diagram of an access control circuit of the present invention.

FIGS. 2-1 and 2-2, with FIG. 2-2 disposed below FIG. 2-1, taken together are a logic diagram of certain component circuits employed in the circuit of FIG. 1.

FIGS. 3-1 and 3-2, with FIG. 3-2 disposed below FIG. 3-1, taken together depict a timing diagram illustrating the operation of the control circuit of FIGS. 1, 2-1, and 2-2 in executing two typical memory-access control words. For the first command, the address register referenced is correctly predicted; whereas, for the second command the prediction of the address register to be referenced is incorrect.

FIGS. 4-1 and 4-2, with FIG. 4-2 disposed below FIG. 4-1, taken together depict a timing diagram which illustrates the operation of the control circuit of FIGS. 1, 2-1, and 2-2 in executing two typical control words which are not memory-access control words.

BEST MODE OF CARRYING OUT THE INVENTION

Figures 1, 2:
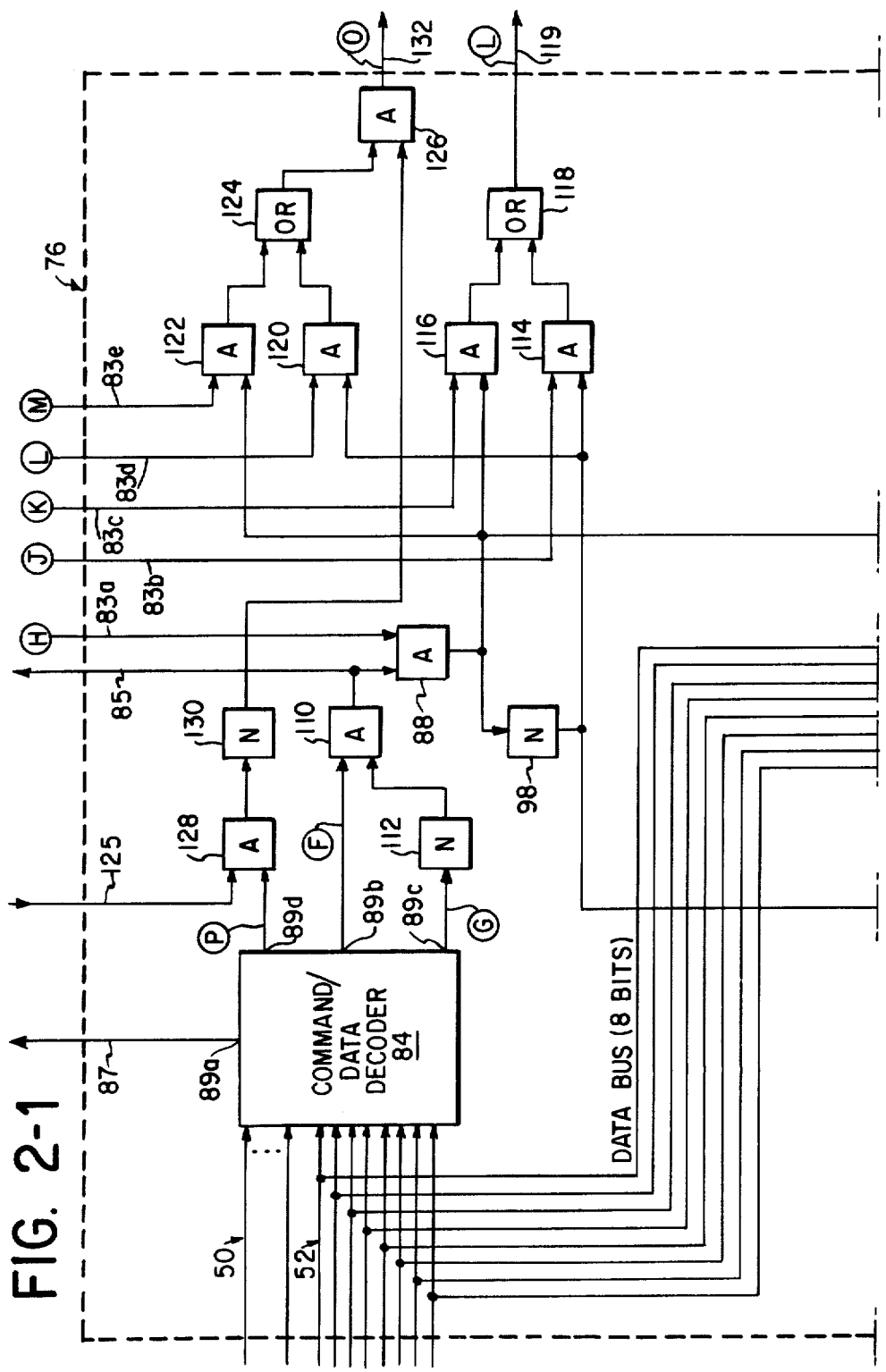
Figure 2:
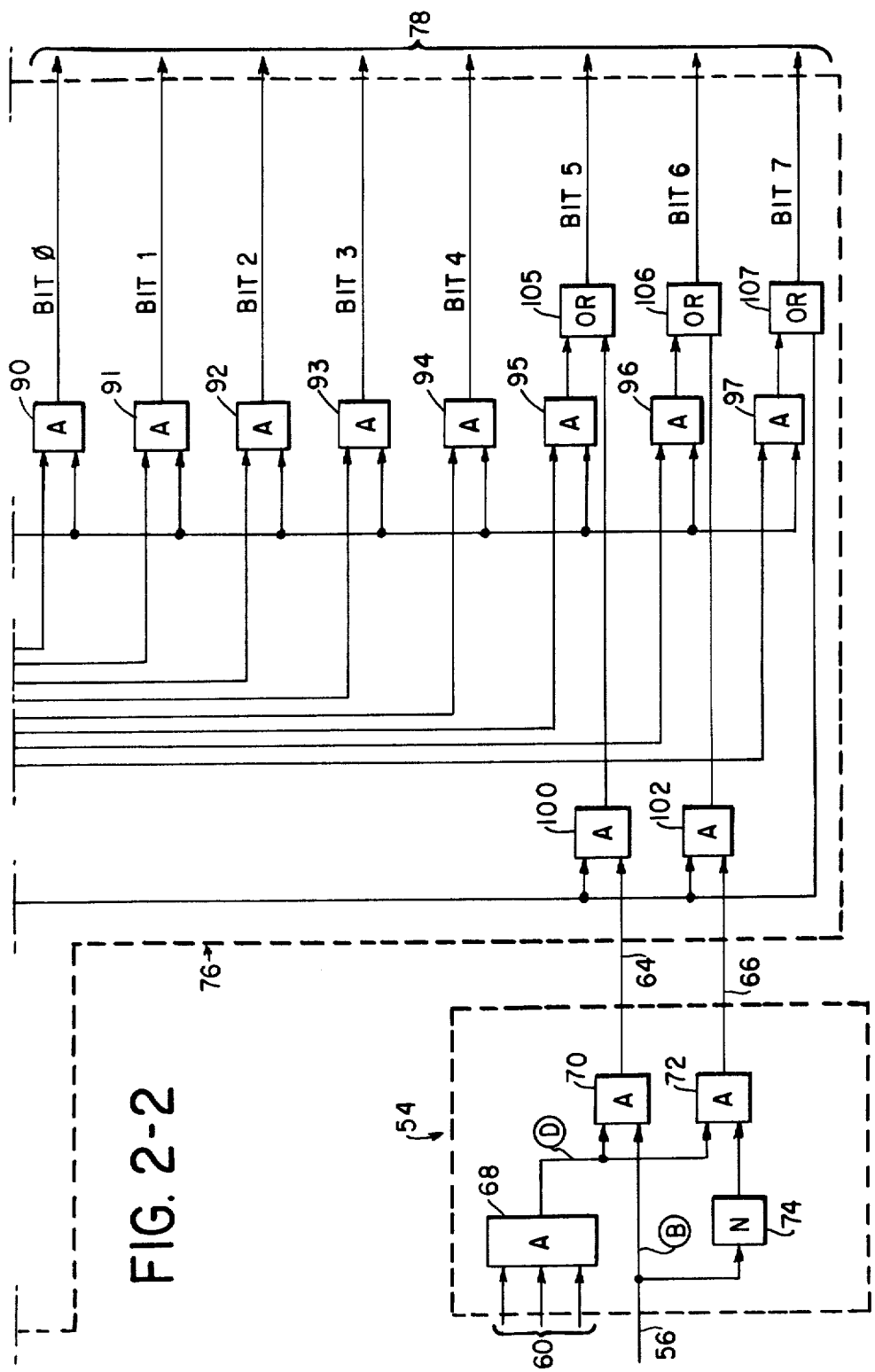

Referring now to FIG. 1, an access control circuit 10 controls access to a main storage unit 12. Both the access control circuit 10 and the main storage unit 12 are components of a digital computer system. The access control circuit 10 forms a part of a microprogrammed central processor of the computer. For conciseness, only those features of the central processor necessary for a full understanding of the present invention are described below. Other elements of the central processor and of the digital computer system can be completely conventional and a discussion of them would only tend to obscure the invention.

Interface to the main storage unit 12 is conventional, the unit having an address input 13, a read/write enable input 14, and a data transfer port 15. The addresses of the locations in the main storage unit 12 to be accessed are stored in a memory array 16, which is organized as a file of address registers. For purposes of illustration, only eight address registers (0-7) are shown in FIG. 1, although two hundred or even more might be used in a complex computer system. The access times of such large memory arrays can be as much as 10 to 20 percent of the access time of the main storage unit itself. The address registers in the memory array 16 are designated with digital identifiers which serve as the addresses of the registers in the array. Thus, for example, three registers which are discussed below in connection with the operation of the control circuit 10, the Instruction Address Register (IAR), the Operand 1 Address Register (OP1), and the Operand 2 Address Register (OP2), are designated with identifiers 1, 3 and 5 respectively. Each of the three address registers RA, RB, and RC, designated by 0, 2 and 4 respectively, is available for use with the address register immediately following to provide an offset address in a virtual memory arrangement. The memory array 16 is a random-access memory array having a register-identity input 17, read-enable input 18, and an address output 20. Connected to the address-output 20 of the memory array 16 is an address bus 22. For simplicity, the inputs and data paths for loading address information into the address registers of memory array 16 are not shown.

A main-store address register 24 is provided for latching the address of the location in the main storage unit 12 to be accessed. The main-storage address register 24 is connected at its data input to the address bus 22 and at its data output to the address input 13 of the main storage unit 12. Latching is accomplished under the control of a signal applied to a latch-enable input 26 of the main-storage address register 24.

A data manipulator 30 is provided for carrying out the arithmatic, logic, and data transfer functions of a conventional central processor of a digital computer. The data manipulator 30 is connected to the main storage unit 12 by an instruction/data bus 32. Included among the local storage registers of the data manipulator 30 are an instruction register 34 for storing machine-language instructions during execution and an instruction buffer register 36 for storing instructions "prefetched" from the main-storage unit 12 prior to the completion of the execution of the preceding instruction. The fetching and execution of successive machine language instructions are thus overlapped to save time.

A control store 40 has a plurality of storage locations for storing control words from which the control signals of the control circuit 10 are in part derived. Connected to the control store 40 is a control-word buffer register 42 for temporarily storing control words read from the control store 40. A control-word decode register 44 is connected to the control-word buffer register 42 for storing the control words during the time they are being decoded by a control-word decoder 46. A timing sequencer 48 is connected to the control-word buffer register 42, the control word decode register 44, and the control word decoder 46 for providing timing and sequencing signals to the circuits. The operation of the timing sequencer 48 is described below in the discussion of the timing diagrams of FIGS. 3 and 4.

The control-word decoder 46 is a logic network which generates control signals in response to the control-words present in the control-word decode register 44. Of particular importance with respect to the present invention are those control words which call for an access to the main storage unit 12. When such a control word is loaded into the decode register 44, the control-word decoder 46 generates a memory-access command on a command bus 50 which specifies the type of access to be made. Such a memory-access command, for example, might specify the reading of data, the reading of an instruction, or the writing of either data or instructions into the main storage unit 12. Memory-access control words include an identifier-specification field which encodes the identifier of the address register in the memory array 16 which contains the address of the location in the main storage unit 12 to be accessed. The control-word decoder 46 decodes the identifier-specification field and gates the corresponding identifier on a one-byte wide data bus 52. Because of the complexity of the control words, the decoding carried out by the control word decoder 46 takes a significant fraction of the cycle time of the central processor.

An address-register predictor 54 is provided to generate two prediction signals which encode a prediction of the identifier of the address register to be referenced by the control word in the control-word decode register 44. These prediction signals are generated at a time significantly before the control-word decoder 46 has gated the actual identifier onto the data bus 52. The address-register predictor 54 has four inputs. A first input is connected to an OP1/OP2 bit-position output 58 of the control word buffer register 42 by an OP1/OP2 signal line 56. The OP1/OP2 bit position falls within the identifier-specification field of memory-access control words and defines an identifier-prediction subfield of such control words. The memory-access control words which are identical except that the address register OP1 is referenced in one and the address register OP2 is referenced in the other, differ only in the state of the bit corresponding to the OP1/OP2 bit-position output 58. The three remaining inputs of the address register predictor 54 are connected to three op-code bit position outputs 62 of the control-word decode register 44 by three op-code signal lines 60. The field of the control word which corresponds to the three op-code bit position outputs 62 defines whether or not the control word is a memory-access command. In particular, in memory-access control words each of these three bit positions is one.

The logic circuit of the address register predictor 54 is illustrated in FIG. 2-2. The address-register prediction signals generated by the address-register predictor 54 are transmitted on a first and a second prediction signal line 64 and 66. A three-input memory-access detector AND gate 68 is connected to the three op-code signal lines 60. Thus when all three input signals are logic ones, the output of the memory-access detector AND gate 68 is also a logic one. When one or more of the input signals is a logic zero, the output is a logic zero. The output of the memory-access detector AND gate 58 is connected to a first input of a first enabling AND gate 70 and a first input of a second enabling AND gate 72. The OP1/OP2 signal line 56 is directly connected to a second input of the first enabling AND gate 70 and is connected to a second input of the second enabling AND gate 72 through an inverter 74. Thus when one or more of the op-code signal lines 60 is a logic zero, i.e., the control word in the control-word decode register 44 is not a memory-access control word, both prediction signal lines 64 and 66 of the address register predictor 54 carry a logic zero. On the other hand, when all three op-code signal lines 60 are logic ones, i.e., the control word in the decode register 44 calls for a storage access, the signal on the OP1/OP2 signal line 56 appears on the first prediction signal line 64 and its inverse appears on the second prediction signal line 66.

Referring again to FIG. 1, an address-word retrieval circuit 76 is connected to the register-identity input 17 of the memory array 16 by an address-register identifier bus 78, which is one byte wide. The address-word retrieval circuit 76 has a first identifier input 80 to which the two prediction signal lines 64 and 66 from the address register predictor 54 are connected. The data bus 52 from the control-word decoder 46 is connected to a second identifier input 82 of the address word retrieval circuit 76. The address word retrieval circuit 76 additionally receives signals from the control word decoder 46 over the command bus 50 and from the timing sequencer 48. Five timing signal lines 83a–e are connected between the address word retrieval circuit 76 and the timing sequencer 48 for transmitting timing signals to the retrieval circuit 76. The timing signals on the timing signal lines 83 are discussed below in connection with FIGS. 3 and 4. A prediction-in-correct signal line 85 is connected between the address word retrieval circuit 76 and the timing sequencer 48 for transmitting a signal indicating that the predicted identifier was not correct.

Referring now to FIGS. 2-1 and 2-2, the address word retrieval circuit 76 includes a command/data decoder 84 which is connected to the command bus 50 and the data bus 52. The command/data decoder 84 is a combinational logic circuit which generates control signals by decoding the commands and data words appearing on the command bus 50 and the data bus 52. The control signals from the command/data decoder 84 used in the control circuit 10 appear at four signal outputs 89a–d. Additional signal outputs of the command-/data decoder 84 transmit control signals used, for example, in connection with data manipulation and input-/output control. Such control signals are not necessary to understand the present invention and, for simplicity, the corresponding signal outputs are not shown. A read/write select signal appears at a first output 89a of the command/data decoder 84. The first output 89a is connected to the read/write enable input 14 of the main storage unit 12 by a read/write select signal line 87. A second output 89b transmits a logic one when a memory-access command is detected on the command bus 50. A third output 89c transmits a logic one when either the identifier of the OP1 address register 3 or the identifier of the OP2 address register 5 appears on the data bus 52. Finally, a fourth output 89d transmits a logic one when a fill-instruction-buffer command (FIB) is detected on the command bus 52. A FIB command instructs the data manipulator 30 to fill the instruction buffer register 36 with the next machine-language instruction if the instruction buffer 36 is empty. The address of the next machine-language instruction is stored in the IAR address register 1. A FIB command, although it involves an access to the main storage unit 12, is not deemed to be a memory-access command since the identifier of the IAR register 1 does not appear on the data bus 52 when a FIB command appears on the command bus 50. Consequently, whenever the fourth output 89d of the command decoder 84 transmits a logic one, indicating that a FIB command is present on the command bus 50, the second output 89b transmits a logic zero, indicating that a memory-access command is not present.

The eight signal lines of the data bus 52 are each connected to eight data-gate AND gates 90–97. The second input of each of the data-gate AND gates 90–97 is connected to an output of a state-switch AND gate 88. Thus the data-gate AND gates 90–97 are enabled by the signal at the output of the state-switch AND gate 88. The output of the state-switch AND gate 88 is also connected to state-switch inverter 98, which in turn is connected to the first inputs of a first and a second prediction-signal-gate AND gates 100 and 102. The action of the state-switch inverter 98 insures that the prediction-signal-gate AND gates 100 and 102 are enabled when the data-gate AND gates 90–97 are disabled, and vice versa. The second inputs of the prediction-signal-gate AND gates 100 and 102 are connected respectively to the prediction signal lines 64 and 66 of the address-register predictor 54. The outputs of the two prediction-signal-gate AND gates 100 and 102 are connected to first inputs of a bit-5 OR gate 105 and a bit-6 OR gate 106 respectively. The second input of the bit-5 OR gate 105 is connected to the output of the sixth data-gate AND gate 95, and the second input of the bit-6 OR gate is connected to the output of the seventh data-gate AND gate 96. The inputs of a bit-7 OR gate 107 are connected to the outputs of the eighth data-gate AND gate 97 and the state-switch inverter 98.

The outputs of the five data-gate AND gates 90–94 are connected to five signal lines of the address-register identifier bus 78. The remaining three signal lines of the identifier bus 78 are connected to the outputs of the three OR gates 105–107. It will be recognized that when the output of the state-switch AND gate 88 is a logic one, the signals appearing on the data bus 52 are passed to the identifier bus 78 through the data-gate AND gates 90–97. When the output of the state-switch AND gate 88 is a logic zero, the signals on the data bus 52 are blocked from appearing on the identifier bus 78. Instead, a binary-number signal defined by 00000XY1 is transmitted to the identifier bus 78, where X and Y are respectively the logic signals appearing on the first and second prediction-signal lines 64 and 66 from the address-word prediction circuit 54.

A first input of a prediction-incorrect AND gate 110 is connected to the second output 89b of the command-/data decoder 84. A second input of the prediction-incorrect AND gate 110 is connected to the third output 89c of the command/data decoder 84 across an inverter 112. Consequently, the prediction-incorrect AND gate 110 produces a logic one when a logic one appears at the second output 89b, indicating a memory-access command is on the command bus 50, and a logic zero appears at the third output 89c, indicating that neither the identifier of the OP1 address register 3 nor the identifier of the OP2 address register 5 is on the data bus 52. In all other cases the prediction-incorrect AND gate 110 generates a logic zero.

The output of the prediction-incorrect AND gate 110 is connected to the prediction-incorrect signal line 85, which is connected in turn to the timing sequencer 48. Also connected to the output of the prediction-incorrect AND gate 110 is a first input of the state-switch AND gate 88. A second input of the state-switch AND gate 88 is connected to a first timing signal line 83a from the timing sequencer 48. A prediction-incorrect signal of logic one from the AND gate 110 enables a state-switch timing signal from the timing sequencer 48. The state-switch timing signal is blocked when the prediction-incorrect signal is logic zero, which signifies that the predicted identifier is correct.

An array-read enable AND gate 114 and a delayed-array-read enable AND gate 116 to have their first inputs connected respectively to the outputs of the state-switch inverter 98 and the state-switch AND gate 88. A second input of the array-read-enable AND gate 114 is connected to a second timing signal line 83b for receiving an array-read timing signal from the timing sequencer 48. Similarly, a second input of the delayed array-read enable AND gate 116 is connected to a third timing signal line 83c for receiving a delayed array-read timing signal. The outputs of the two read enable AND gates 114 and 116 are connected to the inputs of an array-read enable OR gate 118, whose output is connected to an array-read enable signal line 119. The array-read enable signal line 119 is connected to the array-read enable input 18 of the memory array 16, as may be seen in FIG. 1.

A latch-enable AND gate 120 and a delayed latch-enable AND gate 122 are connected at their first inputs respectively to the outputs of the state-switch inverter 98 and the state-switch AND gate 88. A second input of the latch enable AND gate 120 is connected to a fourth timing signal line 83d for receiving a latch address-word timing signal from the timing sequencer 48. A second input of the delayed latch enable AND gate 122 is connected to a fifth timing signal line 83e for receiving a delayed latch address-word timing signal. The outputs of the two latch-enable AND gates 120 and 122 are connected to the inputs of a latch enable OR gate 124. The output of the latch-enable OR gate 124 is connected to a first input of a latch-enable override AND gate 126. The output of the latch-enable override AND gate 126 is connected to a latch-enable signal line 132, which is connected to the latch-enable input 26 of the main-storage address register 24.

A second input of the latch-enable override AND gate 126 is connected to the output of an instruction-buffer-test AND gate 128 across an instruction-buffer-test inverter 130. A first input of the instruction-buffer test AND gate 128 is connected to an instruction-buffer-full signal line 125 which in turn is connected to an output of the data manipulator 30. A logic one appears on the instruction-buffer-full signal line 125 when the instruction buffer register 36 contains the next machine-language instruction to be executed. After the instruction in the instruction buffer register 36 has been transferred to the instruction register 34, a logic zero appears on the instruction buffer full signal line 125. A second input of the instruction-buffer-test AND gate 128 is connected to the fourth output 89d of the command-/data decoder 84. Thus, even though a logic one appears at the fourth output 89d indicating that a fill-instruction-buffer (FIB) command has been detected on the command bus 50, the contents of the IAR register 1 will not be loaded into the memory address register 24 if a logic one also appears on the instruction-buffer-full signal line 125, since in that case a logic zero will be applied to the second input of the latch-enable override AND gate 126. If either the fourth output 89d of the command/data decoder 84 or the instruction-buffer-full signal line 125 carries a logic zero, a logic one is applied to the latch-enable override AND gate 126, permitting the latch address-word enable signal from the latch-enable OR gate 124 to be passed to the latch enable signal line 132.

The operation of the control circuit 10 may be understood by referring to the timing diagrams of FIGS. 3-1, 3-2, 4-1, and 4-2. The timing signals illustrated in these two diagrams appear on signal lines in FIGS. 1, 2-1, and 2-2. The timing signals are designated by circled letters, which are used to identify the signal lines on which the signals appear. For simplicity, short time delays introduced by the logic gates of the circuits are not shown.

The timing diagram of FIGS. 3-1 and 3-2 illustrates the operation of the control circuit 10 in processing two typical control words. The first control word calls for an access to the main storage unit 12 at the location specified in the OP1 register 3 in the memory array 14. The second control word also specifies an access to the main storage unit 12, but differs from the first control word in that the RE address register 7 is referenced. Although the first and second control words reference two different address registers, the OP1/OP2 bit position is a logic one in both words. Those control signals involved in processing the second control word which are different from corresponding control signals arising during the processing of the first control word are designated with primed reference letters.

Referring to FIGS. 3-1 and 3-2, the cycle of the timing sequencer 48 is divided into four time intervals of about 50 nsec each designated $\tau_1$, $\tau_2$, $\tau_3$, and $\tau_4$. The control-word buffer register 42 is loaded with the "next control word" by signal A in time interval $\tau_4$ before execution of the "current control word" has been completed. After the buffer register 42 has been loaded, the logic one of the OP1/OP2 bit position appears at the OP1/OP2 bit-position output 58 of the buffer register 42, as signal B illustrates. The control-word decode register 44 is loaded with the control word in the buffer register 42 in the time interval $\tau_2$ by the control signal C to begin decoding of the control word by the control-word decoder 46. The states of the three op-code bit positions which determine if the control word in the decode register 44 is a memory-access control word are forwarded to the memory-access detector AND gate 68 in the address register predictor 54. Since both control words in the examples under consideration are memory access control words, the memory-access detector AND gate 68 generates a logic one in both cases as indicated by signal D. Signal D is combined with signal B from the OP1/OP2 bit-position output 58 of the buffer register 42 in the address register predictor 54 to generate a logic one on the first prediction signal line 64 and a logic zero on the second prediction signal line 66. These prediction signals are present during a time which substantially coincides with signal I.

After the control word stored in the decode register 44 has been decoded by the control-word decoder 46, the memory-access command is gated onto the command bus 50. This occurs at the time indicated by signal E. In the case of the first control word, the binary-number identifier 00000011 corresponding to the OP1 address register 3 is gated onto the data bus 52 at the same time. In the case of the second control word, the binary-number identifier 00000111 corresponding to the RE address register 7 is gated onto the data bus 52, at the time indicated by signal E. The presence of a memory-access command on the command bus 50 is detected by the command/data decoder 84, which as a result generates the signal F at its second output 89b. Because of the relative complexity of the control word decoder 46 and the command/data decoder 84, the appearance of the signal F indicating the presence of a memory-access command on the command bus 50 is significantly delayed from the appearance of the signal D generated by the single three-input memory-access detector AND gate 68.

The signals transmitted from the third output 89c of the command/data decoder 84 differ for the first and the second control words. In the case of the first control word, which references the OP1 register 3, the signal G is transmitted. In the case of the second control word, which does not reference either the OP1 or the OP2 address register, the third output 89c remains at logic zero, as shown by signal G'.

The timing sequencer 48 generates the state-switch timing signal H, which defines a transition time subsequent to the decoding of the command and data information by the command/data decoder 84, and thus at a time when the output of the prediction-incorrect AND gate 110, which makes use of signals from the decoder 84, indicates whether or not the predicted identifier is correct. It will be recalled that the output oft the prediction-incorrect AND gate 110 enables the state-switch timing signal by means of the state-switch AND gate 88. Before the state-switch transition time defined by signal H, the predicted identifier 00000011, corresponding to the OP1 register 3, appears on the identifier bus 78 for both the first and the second control words. As signal I shows, after the state switch transition time, the identifier 00000011 remains on the identifier bus 78 in the case of the first address word, since in that case the predicted identifier is correct. In the case of the second control word, the correct identifier 0000011 replaces the incorrect predicted one at the state switch transition time, as indicated by signal I'.

The array-read timing signal J and the delayed array-read timing signal K are generated by the timing sequencer 48. The array-read enable timing signal J is passed to the array-read enable signal line 119 unless a state switch occurs. Thus in the case of the first control word, the array-read enable signal L corresponds to the array-read enable timing signal J. For the second control word, the array-read enable signal L' is switched from the array-read enable timing signal J to the delayed array-read enable timing signal K at the state switch transition time. Although this results in the memory array 16 being accessed twice, the incorrect address word which is read during the earlier enable is ignored, as will be seen below.

The timing sequencer 48 also generates the latch address-word timing signal M and the delayed latch address-word timing signal N. Both of these signals M and N occur about 25 nsec after the occurrence of the corresponding array-read enable signals J and K in order to allow time for the address word to be fetched from the memory array 16. Note that both of these timing signals are operative after the state-switch transition time defined by the state-switch timing signal H. Thus the latch address-word signal applied to the latch input 26 of the main-storage address register 24 corresponds to either the latch-address-word timing signal or the delayed latch-address-word timing signal N depending on whether or not a state transition is made at the state-switch transition time. This is shown by signal O for the first control word and signal O' for the second. Observe that in the case of the second control word, the predicted address word accessed by the earlier array read enable of signal L' is ignored since the latch address-word enable signal O' remains at logic zero throughout the earlier array-read enable.

If the latch address-word signals O and O' are compared, it will be seen that the memory access is begun about 100 nsec earlier in the cycle in the case of the first control word, for which the predicted identifier was correct, than in the case of the second control word, for which the prediction was not correct. Subsequent to a cycle involving a memory access in which an incorrect prediction was made, the timing sequencer 48 restarts after a 100 nsec delay to take account of the additional 100 nsec spent in accessing the correct storage location. The timing sequencer 48 is notified of the need to insert a delay by the prediction-incorrect signal on the prediction-incorrect signal line 85.

The predicted identifier is always correct when the OP1 or OP2 address registers are referenced. Since these two address registers, together with the IAR address register 7, are by far the most frequently referenced in the operation of the computer system of which the control circuit 10 is a part, a significant savings of time results on the average.

Figures 2, 4:
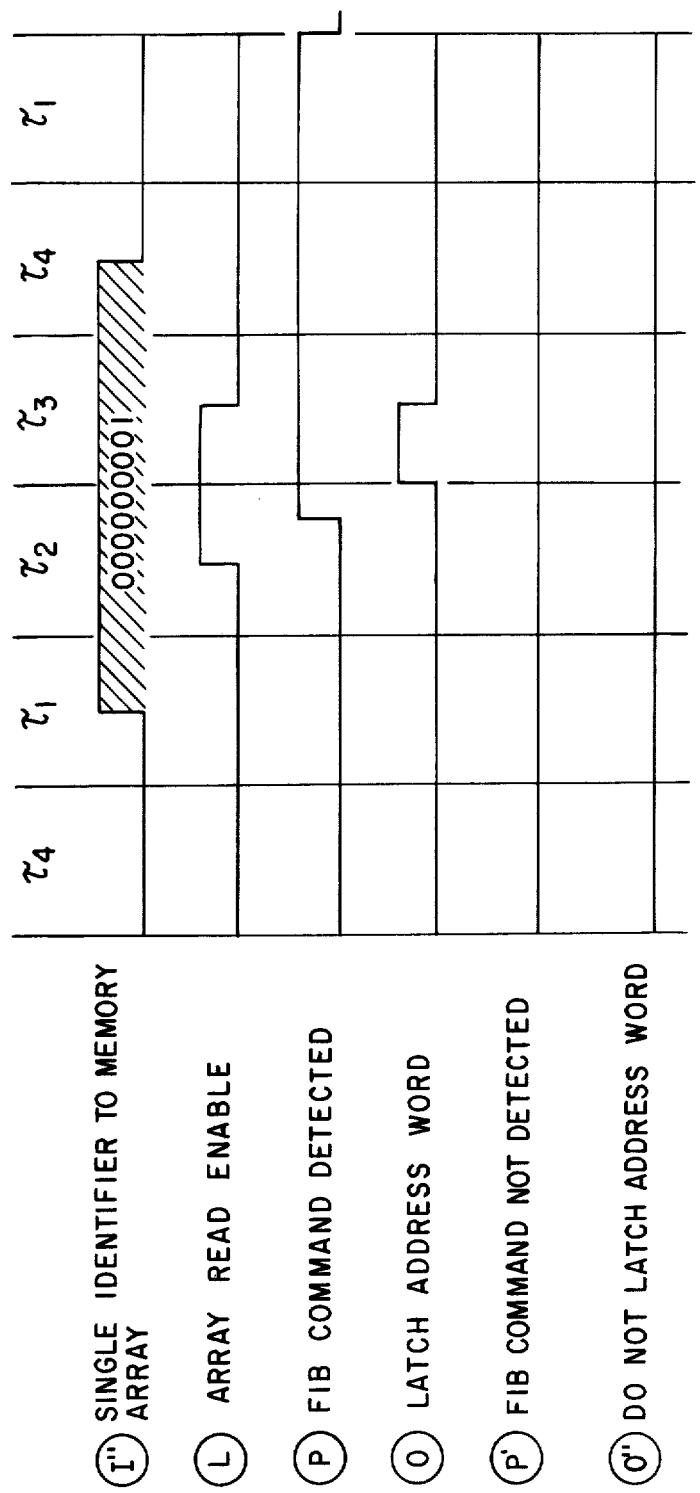

Turning now to FIGS. 4-1 and 4-2, a timing diagram illustrates the processing of two control words, neither of which call for a memory access. The two control words termed the third and fourth control words, differ from one another in that the third calls for a fill-instruction buffer operation, whereas the fourth does not. The instruction buffer register 36 is taken to be empty in both cases, and the OP1/OP2 bit positions in the control words are taken to be logic ones. It will be understood that the OP1/OP2 bit position is not used to encode an identifier of an address register in control words such as the two under consideration which are not memory-access control words. Control signals of the fourth control word which differ from those of the third are designated by primed reference characters. In addition, control signals which differ from corresponding signals of FIGS. 3-1 and 3-2 are designated by double-primed reference characters.

Referring now to FIGS. 4-1 and 4-2, the loading of the control-word buffer register 42 and the control-word decode register 44 are controlled by signals A and C which are identical to the corresponding signals in the timing diagram of FIG. 3-1 discussed above. In general, the timing signals produced by the timing sequencer 48 are the same in this example as they were in the example of FIGS. 3-1 and 3-2. As a result of loading the control words in the buffer register 42, a signal B appears at the OP1/OP2 bit-position output 58 of the buffer register 42. The signal B is also identical to the corresponding signal in FIG. 3-1. However, because neither the third nor the fourth control word is a memory access command, the signal D" at the output of the memory-access detector AND gate 68 remains a logic zero. Command and data information are gated into the command bus 50 and the data bus 52 respectively by the control-word decoder 46 at the time indicated by signal E. Since the command on the command bus 50 is not a memory access command, the second output 89b of the command/data decoder 84 remains a logic zero. Consequently the output of the prediction-incorrect AND gate 110 remains at a logic zero whether or not the third output 89c of the command/data decoder 84 indicates that a binary number corresponding to the identifiers of either the OP1 or OP2 address register happens to be on the data bus 52. The output of the state-switch AND gate 88 consequently remains clamped at logic zero, thus blocking the state switch timing signal carried by timing signal line 83a. Therefore, no state switch is made.

The two prediction signals from the address register predictor 54 are fixed at logic zero because the signal D" applied to the first inputs of the two enabling AND gates 70 and 72 is logic zero. Consequently the binary-number identifier 00000001 appears on the identifier bus 78, as is indicated by signal I". This identifier corresponds to the IAR address register 1. The array-read-enable signal L coincides with the array-read timing signal J shown in FIG. 3 since no state switch is made.

In the case of the third control word, the fourth output 89d of the command/data decoder 84 generates a signal P when the FIB command is detected on the command bus 50. Since the instruction buffer register 36 is empty, the instruction-buffer-full signal line 125 carries a logic zero. Consequently the latch address-word signal O loads the address word contained in the IAR address register 1 into the main-storage address register 24. The case of the fourth control word differs from the third in that the command/data decoder 84 does not detect a FIB command and thus the signal P' remains a logic zero. As a result no latch address-word signal is passed to the latch address-word signal line 132 and thus the contents of the IAR address register 1, although present on the address bus 22, are not loaded into the main storage register 24.

It is not intended to limit the present invention to the specific embodiment described above. For example, the three op-code bit-position signals applied to the memory-access detector AND gate 68 could be taken from the control-word buffer register 42 instead of the control-word decode register 44. Such an arrangement would have the advantage of making the prediction signals from the address-register predictor 54 available even earlier in the machine cycle. However, an additional three signal lines from the control-word buffer register 42 would be required, which would entail additional expense and might conflict with pinout restrictions if the circuits were implemented as large-scale integrated circuits. It will readily be apparent to those skilled in the art that the states of bit positions in control words other than those set forth specifically above may be used in generating prediction signals and that prediction signals may be used in other ways to generate address words. It is recognized that these and other changes may be made in the circuit and process specifically described herein without departing from the scope and teachings of the instant invention, and it is intended to encompass all other embodiments, alternatives and modifications consistent with the present invention.

We claim:

1. An access control circuit for a digital primary storage device having a plurality of storage locations identified by digital primary-storage addresses and a primary storage address input terminal for receiving an address signal specifying the storage location to be accessed, the control circuit comprising:
   (a) a plurality of address registers designated by digital identifiers, each address register being capable of storing a digital address word which encodes a primary-storage address;
   (b) a control store having a plurality of control-store locations, each of the locations being capable of storing each of a plurality of digital control words encoding primary-storage access commands for accessing storage locations in the primary storage device, the storage location to be accessed being determined by a primary-storage address encoded in an address register specified by the primary-storage access command;
   (c) a control-word buffer register connected to the control store for temporarily storing control words read from the control store, the buffer register having at least one bit-position output defining an identifier-prediction-field output;
   (d) a control-word decode register connected to the control-word buffer register for receiving control words from the control-word buffer register and storing them for decoding, the decode register having a plurality of bit-position outputs which define an identifier-specification-field output;
   (e) control-circuit timing sequencer means for loading control words from the control store into the control-word-buffer register for storage during a first time interval and subsequently loading the control words from the control-word buffer register into the control-word decode register for storage during a second time interval;
   (f) address-register-prediction circuit means connected to the control-word buffer register for predicting an address register specified by the control word stored in the buffer register, the address-register-prediction circuit having:
      (f.1) an identifier-prediction-field input terminal connected to the identifier-prediction-field output terminal of the control-word-buffer register,
      (f.2) a predicted-identifier output terminal, and
      (f.3) a partial-decoder circuit for generating address-register prediction signals at the predicted-identifier output terminal responsive to control-word-bit signals applied to the identifier-prediction-field input terminal during the first time interval;
   (g) control-word-decoder circuit means connected to the control-word decode register for fully decoding the specification of the address register by the control word stored in the decode register, the control-word decoder circuit having;
      (g.1) an identifier-specification-field input terminal connected to the identifier-specification-field output terminal of the control-word decode register,
      (g.2) a specified-identifier output terminal, and
      (g.3) a decoder circuit for generating address-register specification signals at the specified-identifier output terminal responsive to control-word-bit signals applied to the identifier-specification-field input terminal during the second time interval; and
   (h) address-word retrieval circuit means connected to the address registers for obtaining information stored in a specified address register, the address-word-retrieval circuit having:
      (h.1) a first identifier input terminal connected to the predicted-identifier output terminal of the address-register-prediction circuit for receiving address-register prediction signals,
      (h.2) a second identifier input terminal connected to the specified-identifier output terminal of the control-word decoder circuit for receiving address-register specification signals, (h.3) predicted-register retrieval-initiator circuit means connected to the first identifier input terminal and to the control-circuit timing sequencer for initiating the retrieval of contents of the address register specified by the signal at the first identifier input at a time before the control-word-decoder circuit has decoded the specification of the address register by the control word in the decode register;

(h.4) identifier-override circuit means connected to the control-word-decoder circuit, to the control circuit timing sequencer, and to the second identifier input terminal for initiating the retrieval of contents of the address register specified by the signal at the second identifier input at a time after the control-word-decoder circuit has decoded the specification of the address register by the control word in the decode register in the event the address register specified at the second identifier input differs from the address register specified at the first identifier input, and (h.5) an address-word output terminal for transmitting signals corresponding to the information stored in the selected address register to the primary storage address input terminal of the primary-storage device.

2. The control circuit according to claim 1 in which the identifier-prediction field of the control word read by the address-register prediction circuit is a subfield of the identifier-specification field of the control word read by the control-word decoder circuit.

3. The control circuit according to claim 2 in which the address-word retrieval circuit further includes:

(h.6) address-ready signal circuit means for generating an address-ready signal at a time the address-word information from the correct address register is available for transmission from the address-word output terminal.

4. The control circuit according to claim 3 in which the address registers are included in a semiconductor integrated-circuit memory array.

5. The control circuit according to claim 4 in which the partial-decoder circuit of the address register prediction circuit and the decoder circuits of the control-word-decoder circuit are digital logic combinational circuits.

6. An apparatus for controlling access to digital primary storage, comprising:

(a) a plurality of address registers, each address register being capable of storing digital address information for determining an address of a storage location in the primary storage, (b) a control store for storing a plurality of memory-access control words, each memory-access control word having an address field for identifying an address register;

(c) control-store reader means for reading a memory-access control word from the control store;

(d) predictor means for partially decoding an address field of the memory-access control word to predict an address register, so that a predicted storage location in the primary storage can be determined with the address information stored in the predicted address register;

(e) decoder means for fully decoding the address field of the control word to determine the address register containing the address information for determining the actual storage location to be accessed;

(f) predicted-location memory-access initiation means for initiating reading of the address information stored in the predicted address register prior to completion of the full decoding of the address field by the decoder means, to initiate a memory access to the predicted storage location; and (g) access-override means for overriding a memory access initiated by the predicted-location memory-access initiation means and reinitiating a memory access to the actual storage location in the event the address register determined upon full decoding of the address field of the control word differs from the predicted address register.

7. The apparatus according to claim 6 in which the address registers are implemented by at least one semiconductor integrated-circuit memory array.

8. The apparatus according to claim 7 in which the predictor means is a digital combinational logic circuit.

9. The apparatus according to claim 8 in which the predictor means is adapted to predict an address register based on the contents of an address-prediction subfield of a memory-access control word, the address-prediction subfield having fewer bits than the address field.

10. The apparatus according to claim 9 further comprising a buffer register connected between the control store and the decoder means for temporarily storing control words read from the control store, the predictor means being connected to the buffer register to permit at least a portion of the address-prediction subfield of a control word stored in the buffer register to be read by the predictor means.

* * * * *

UNITED STATES PATENT AND TRADEMARK OFFICE
CERTIFICATE OF CORRECTION

PATENT NO. : 4,236,205
DATED : November 25, 1980
INVENTOR(S) : Douglas M. Kindseth et al.

It is certified that error appears in the above—identified patent and that said Letters Patent is hereby corrected as shown below:

Column 11, line 26, "oft" should read -- of --.

Column 11, line 37, "0000011" should read -- 00000111 --.

Signed and Sealed this

Tenth Day of March 1981

[SEAL]

Attest:

RENE D. TEGTMEYER

*Attesting Officer*   *Acting Commissioner of Patents and Trademarks*